United States Patent [19]

Canuel

[11] Patent Number: 4,897,865
[45] Date of Patent: Jan. 30, 1990

[54] TELEPHONE DATA COLLECTION DEVICE

[75] Inventor: Albert Canuel, Surrey, Canada

[73] Assignee: Epic Data, Inc., Richmond, Canada

[21] Appl. No.: 188,401

[22] Filed: Apr. 29, 1988

[51] Int. Cl.$^4$ .......................................... H04M 17/02
[52] U.S. Cl. ....................................... 379/91; 379/93; 379/144
[58] Field of Search ............................ 379/91, 93, 144

[56] References Cited

U.S. PATENT DOCUMENTS

| 3,571,799 | 3/1971 | Coker et al. | 340/152 |
|---|---|---|---|
| 3,852,571 | 12/1974 | Hall et al. | 235/61.7 B |
| 3,938,090 | 2/1976 | Borison et al. | 340/149 A |
| 4,439,636 | 3/1984 | Newkirk et al. | 379/91 |
| 4,500,776 | 2/1985 | Laser | 235/162 |
| 4,503,288 | 3/1985 | Kessler | 379/104 |
| 4,517,412 | 5/1985 | Newkirk et al. | 379/91 |
| 4,535,204 | 8/1985 | Hughes et al. | 179/90 BD |
| 4,549,302 | 10/1985 | Heatherington | 375/8 |
| 4,554,418 | 11/1985 | Toy | 179/2 DP |
| 4,654,482 | 3/1987 | DeAngelis | 379/95 |

FOREIGN PATENT DOCUMENTS 0251296  1/1988  European Pat. Off. ............. 379/96

OTHER PUBLICATIONS

M. Demeaute et al, "The T.V. 260 & Transactional Telephone", *Commutation & Transmission*, No. 1, 1985.
S. L. Weinstein, "Smart Credit Cards the Answer to Cashless Shopping", *IEEE Spectrum*, 2/84, pp. 43-49.

Primary Examiner—Robert Lev
Attorney, Agent, or Firm—Christensen, O'Connor, Johnson & Kindness

[57] ABSTRACT

A telephone data terminal and data collection network for communicating data over a telephone system using DTMF tone dialing. A telephone data terminal (10) includes an optical bar code reader wand (16) and a slot (22) in which a magnetic field sensor is disposed for reading variations in magnetic field intensity on a magnetic strip (24) applied to a card (24). Data encoded as a bar code, or stored in the magnetic strip, are converted to ASCII data by a CPU (50), and are transmitted either as a DTMF signal to a remote location over the telephone system, or as a data link signal that is incompatible with the telephone system, to a data processor (252). The telephone data terminal can be operated in either a voice prompted data collection mode or a display prompted data collection mode. It includes a two-by-twenty character alphanumeric LCD display (14) in which a prompt message is displayed to a user. The display also may be used in a message mode for displaying a message that the user enters by scanning an appropriate encoded data bar code or magnetic strip. When operating in the display prompted data collection mode, a telephone line controller (110) disconnects the telephone data terminal from the telephone system, and causes a local telephone line connected to it to appear "busy," with respect to any incoming telephone calls.

23 Claims, 5 Drawing Sheets

TELEPHONE DATA COLLECTION DEVICE

TECHNICAL FIELD

This invention generally pertains to a device for reading encoded data for transmission to another location and, specifically, to a device that transmits the data over a telephone line.

BACKGROUND OF THE INVENTION

The telephone system is frequently used for communicating data between a terminal or a personal computer (PC) and remote terminal or computer, which are linked by a modem at each end of the phone line. Data typed into a keyboard at one end of the link are usually displayed on a monitor screen as they are input to the modem. The modem converts the signal output from the computer to a format suitable for transmission over the relatively narrow bandwidth of a standard voice communication telephone line. The receiving modem converts the signal back to a signal that is input to the receiving terminal and is displayed on its monitor. Data files downloaded from magnetic disks or from the electronic memory of a computer are transmitted in a similar manner, usually without being displayed on the monitor of either the transmitting or the receiving device.

Using a PC as a data terminal is relatively expensive and requires that a significant amount of desktop space be devoted to the computer. In a data collection network of users requiring occasional transmission of only relatively short data messages, providing a PC for each user in the network just for data collection may not be justified. Since a conventional PC terminal includes features that may not be required by a user, such as a full keyboard and a floppy disk (or hard drive), elimination of these components from the data terminal greatly reduces the cost of a network comprising many such data terminals and the user space required for each terminal. Further economics of size and cost are achieved by using an alphanumeric display having only one to two lines of characters instead of a full screen monitor. In addition, the low cost data terminal may include a more efficient input device and another form of nonvolatile memory in place of the keyboard and magnetic disk storage devices used on a PC.

In a data collection network in which data transmitted by each user are standardized, a typical data message may comprise, for example, a predefined function code, followed by a number. To facilitate rapid data entry, a list of commonly used predefined function codes and numerical sequences (or the digits from 0-9) should be stored in a nonvolatile media that is readily available to the user for input to his terminal. The input device should facilitate rapid data entry, but eliminate operator errors that occur when data are entered on a keyboard. One solution to this problem is to store the data as an optically scanned bar code.

Universal product codes (UPC) are one form of a bar code that is well known and commonly used in commerce to identify a product. A clerk scanning a UPC imprinted on the label of a product with an optical sensor wand inputs the UPC encoded data for transmission to a central processor that maintains inventory and pricing data for the store. Since all the common alphanumeric characters are represented by a Code 39 bar code, it can readily be used to store other data besides product identification. A printed list of predefined bar codes can thus serve as a nonvolatile storage medium for data messages that are input with an optical sensing wand for transmission over a telephone line.

An alternative medium for storing relatively short data messages is a magnetic strip. Magnetic strips are frequently used on credit cards for storing an identification code that is transmitted to a remote data processor by a merchant to confirm a credit transaction. The merchant also enters numerical data, either on a key pad or verbally over the telephone. U.S. Pat. No. 3,571,799 discloses a credit authorization terminal including a magnetic strip reader and a keyboard intended for just such use. Prior art magnetic strip data input terminals are typically dedicated to input of specific kinds of data, such as a credit card number, and are not designed for general data collection use.

Besides enabling the user to input short data messages stored on a nonvolatile medium, it is desirable that a low-cost data terminal provide other functions. For example, it would be expedient to store data messages that are frequently transmitted in a nonvolatile memory within the data terminal, so that they can be readily recalled and transmitted. It would also be desirable to permit a receiving data processor in the data collection network to prompt the user of the data terminal for input of specific data, either verbally, or through a message that is transmitted over the telephone line as a data signal and shown on the display of the data terminal. In addition, the user of the data terminal may wish to enter a message on his terminal display panel indicating, for example, where he may be reached while away from his desk.

Communication between a plurality of data terminals at a given location using the installed phone system wiring is typically only possible if a data signal compatible with the phone system is used. Standards have been promulgated requiring that signals produced by devices connected to the telephone system conform to certain specifications (Part 68, FCC Rules). Data are normally communicated over the telephone system using some form of a variable frequency signal that conforms to these standards (e.g., CCITT V.22, Bell 103, and Bell 212A).

One type of signal compatible with the telephone system comprises dual tone variations. Signals based on the dual tone multiple frequency (DTMF) system are preferred on most telephone exchanges to the alternative pulse system for dialing a telephone number. The DTMF signals control switching gear that connect the dialing phone to another phone in the system. Although DTMF signals are normally not used to convey characters other than the numbers 0-9, # and *, they can be used to convey a full range of alphanumeric data by combining them in specific combinations. Data transmission using DTMF signals is inherently slow, on the order of from three to ten characters per second. Modems communicate at much higher rates using quadrature amplitude modulation, differential phase shift keying, or frequency shift keying. However, the circuits to implement these schemes are somewhat expensive. Although the low data transfer rate of DTMF signals may be adequate for short data messages, a higher data communication rate may sometimes be preferred. It may also be desirable to use a signal which is not generally compatible with the requirements of the telephone system, such as a varying DC polarity, for communication between local terminals. Conventional data terminal systems generally do not include any provision for communication over installed local phone lines, other than by using telephone system compatible signals.

In consideration of the features and functions desired of the data terminal and data collection network described above, which are not provided by the prior art, it is an object of the present invention to provide a compact, relatively low cost data terminal for use in a data collection network to communicate data over a telephone system that uses DTMF tone dialing. It is a further object of the invention to store data in the data terminal, within nonvolatile memory, for selective recall and transmission.

Yet another object is to provide means for the data terminal to receive a prompt message from a remote data processor, requesting specific data be transmitted. A still further object is for the data terminal to communicate data over a local telephone line to other local data terminals or a data processor, using signals that are incompatible for use on the telephone system. These and other objects and advantages of the present invention will be apparent from the attached drawings and from the Description of the Preferred Embodiment that follows.

SUMMARY OF THE INVENTION

Apparatus are disclosed for reading encoded data that are stored in a nonvolatile medium, so that they may be transmitted from one location to another over a telephone system. The apparatus includes means for scanning the encoded data, producing a data signal. Processor means are connected to the means for scanning the encoded data and are operative to convert the data signal into ASCII data. In response to an operator scanning a first predefined encoded data sequence with the means for scanning, the processor means enter a program mode. Nonvolatile memory means, connected to the processor means, digitally store the ASCII data in an addressable register as the encoded data is scanned by the operator.

The apparatus further includes tone generator means, connected to the processor means and to the telephone system, for converting the ASCII data into a DTMF signal that is transmitted to the other location over the telephone system. The nonvolatile memory means include a plurality of addressable registers, in which different ASCII data are digitally stored. The processor means are further operative to cause the tone generator means to convert the ASCII data stored in an operator-selected addressable register into the DTMF signal for transmittal to the other location. ASCII data stored in a specific addressable register selected by the processor means in response to the operator scanning a second predefined encoded data sequence with the means for scanning are displayed by the display means. The encoded data comprise either bar codes or areas of varying magnetic field intensity occurring sequentially along a magnetic strip. The means for scanning the bar codes comprise an optical bar code sensor, while the means for scanning the magnetic strip comprise a magnetic field sensor. When the processor means are operating in the program mode, a telephone connected to the telephone system with the apparatus is usable and functions in a conventional manner.

When the apparatus is connected to the telephone system through a local telephone line controller, it can operate in a display prompted data collection mode. The processor means are then operative to receive a prompt message from the local telephone line controller over a local telephone line, requesting that specific encoded data be transmitted. The prompt message is displayed on an alphanumeric character display, thereby prompting an operator reading the message to scan the requested encoded data with the scanning means. The processor means are operative to convert the data signal produced by the operator scanning the requested encoded data into a data link signal for transmission through the local telephone line controller to a receiving station.

In response to the operator scanning data that causes the processor means to operate in the display prompted data collection mode, the local telephone line controller disconnects the telephone line from the telephone system. Data can then be transmitted using a data link signal comprising an asynchronous signal having a varying direct current polarity, which is not compatible with the telephone system.

Alternatively, the processor means can operate in a voice prompted data collection mode in response to the operator scanning appropriate encoded data. In this mode, the operator receives voice signals over the telephone prompting the operator to scan requested encoded data with the scanning means. The requested encoded data is converted to ASCII data by the processor means and to a DTMF signal by the tone generator means for transmission to the receiving station over the telephone system.

Operation of the apparatus in a message mode is effected in response to the operator scanning a predefined encoded data sequence. In the message mode, the display means display an alphanumeric message corresponding to encoded data scanned by the operator with the scanning means.

In another aspect, the invention comprises a plurality of local data terminals, each including: scanning means for scanning encoded data, producing a data signal; processor means, connected to the scanning means, for converting the data signal to ASCII data; and tone generator means, connected to the processor means and to a local telephone line, for converting the ASCII data into a DTMF signal that is transmitted over the local telephone line. A local data processor is connected and is operative to bidirectionally receive and transmit data using a data link signal.

Telephone line controller means are connected to the plurality of local data terminals by the local telephone lines, and to the local data processor by data lines. The telephone line controller means are operative to selectively control the flow of data link signals between any one of the local data terminals and the local data processor, and to control the flow of DTMF signals between any one of the local data terminals and a remote location over the telephone system, in response to an operator scanning predefined encoded data sequences at said one of the local data terminals using the scanning means. The telephone line controller means respond to the DTMF signal produced by the tone generator at the one local data terminal, as the operator scans a selected predefined encoded data sequence, by disconnecting the one local data terminal from the telephone system and connecting it in communication with the data processor using data link signals that are incompatible with the telephone system. The telephone line controller means then cause the local telephone line connected to the local data terminal to appear "busy," with respect to any incoming telephone calls directed to it.

DESCRIPTION OF THE PREFERRED EMBODIMENT

Figure 1:
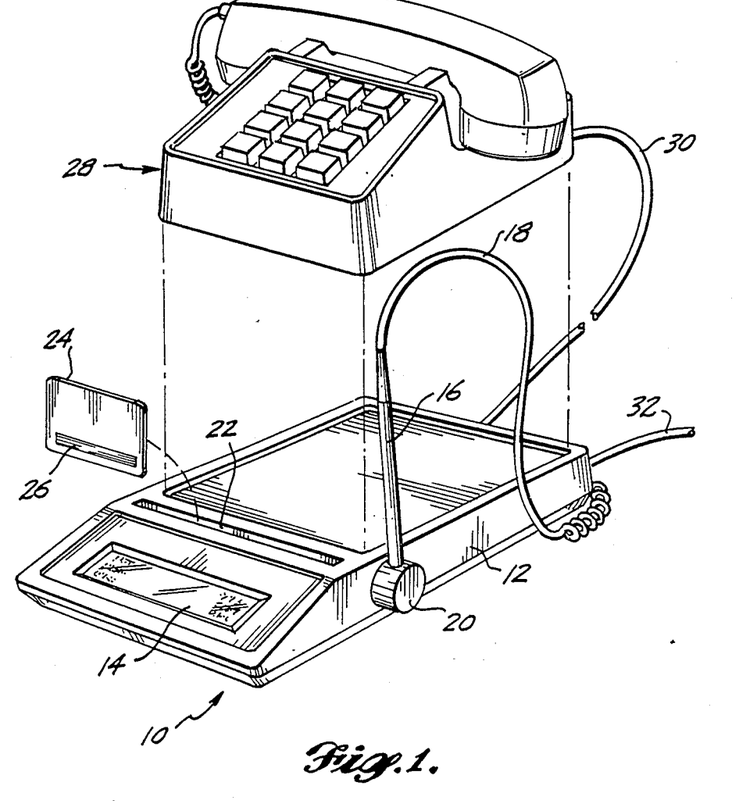
FIG. 1 is an isometric view of a telephone data terminal, in accordance with the present invention.

FIG. 1 illustrates a relatively low-cost, compact telephone data terminal, generally denoted by reference 10. Telephone data terminal 10 includes a plastic or metal case 12 having a relatively low profile and a flat upper surface suitable for support of a conventional desktop telephone. The beveled front portion of telephone data terminal 10 includes an alphanumeric display 14 comprising in the preferred embodiment, a liquid crystal display (LCD) including two lines, each of 20 alphanumeric characters.

A bar code reader wand 16 is attached to the rear of case 12 by means of a connecting lead 18 and is supported when not in use on the side of the case in a holder 20. The bar code reader wand is generally of conventional design, and includes an internal light sensor (not shown), which responds to light reflected from a bar code as a user moves a transparent lens (not shown) on the end of the wand across the bar code from one end to the other. In the preferred embodiment, a Welch Allyn model SSR (or SRD) optical reader wand is used; however, any equivalent device may be used for bar code reader wand 16.

Telephone data terminal 10 includes an alternative mechanism for data input comprising a magnetic field sensor (not shown) that is disposed within a slot 22, at the front top edge of case 12. The magnetic field sensor is mounted approximately at the midpoint of slot 22, inside the telephone data terminal, and is used to sense magnetic field intensity variations along a magnetic strip 26, which is applied to the surface of a plastic card 24. The card is inserted within slot 22, with the magnetic strip facing toward the magnetic field sensor, and is moved smoothly from one side to the other, thereby sliding the magnetic strip past the magnetic field sensor. Data magnetically stored on the magnetic strip is thus read into the circuitry of the telephone data terminal. A magnetic field sensor of the type used to read the data on the magnetic strips applied to credit cards is suitable for use in this application.

A conventional push-button telephone 28 is attached by a telephone line 30 to a modular phone jack (not shown in FIG. 1) disposed on the rear panel of case 12. In addition, one end of a telephone lead 32 is plugged into another modular telephone jack (also not shown in FIG. 1) on the rear panel of case 12, the other end being connected to a local telephone line within the building in which telephone data terminal 10 is installed.

Figure 2:
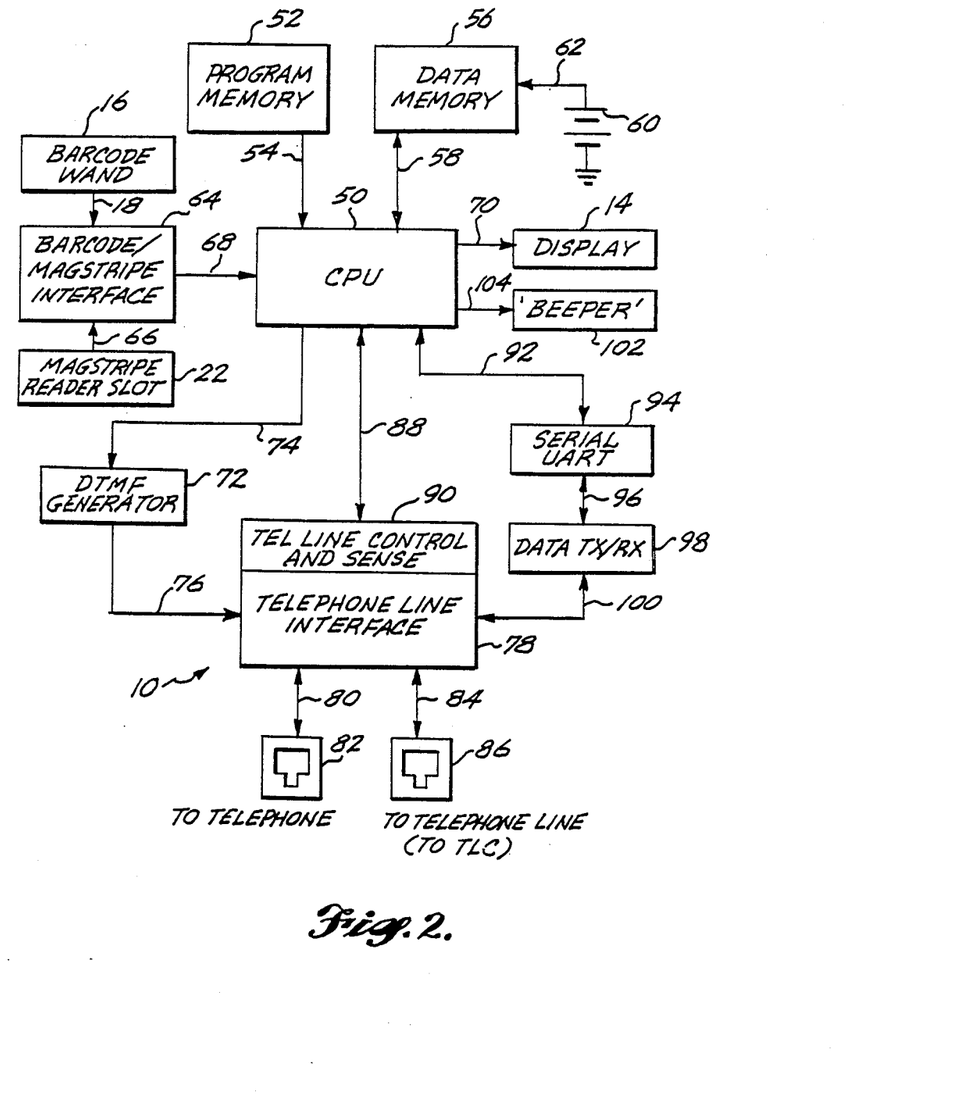
FIG. 2 is a schematic block diagram illustrating the elements comprising the telephone data terminal.

Turning now to FIG. 2, a block diagram schematically illustrates details of the circuitry comprising telephone data terminal 10. Operation of the telephone data terminal is generally controlled by a central processing unit (CPU) 50, which in the preferred embodiment includes an eight-bit microprocessor (Intel type 8085), two 16-bit timers and parallel input/output circuits (National type NS810 integrated circuit), address decoder (Motorola type 74HC139 integrated circuit), and address and data bus drives (Motorola type 74HC573). Other microprocessors and integrated circuits having similar characteristics are suitable for use in this CPU. The integrated circuits and microprocessor are connected in a conventional manner, as is well known to those of ordinary skill in the art, and thus need not be separately shown.

The functions implemented by telephone data terminal 10 are controlled by a software program digitally stored within a read only memory (ROM) 52, which is connected to the CPU by a plurality of address/data lines 54. The preferred embodiment includes 32K bytes of nonvolatile read only memory, which store the program instructions executed by CPU 50. In addition, a random access memory (RAM) 56 is used to store relatively short-term read/write data, such as the processor stack data, data being transmitted and displayed, and user input data that is selectively addressable for recall, as explained below. Since RAM 56 is required to store data through periods in which power supplied to telephone data terminal 10 may be interrupted, a backup battery power supply 60 is connected to the RAM by a lead 62, insuring nonvolatile data retention. RAM 56 is connected to CPU 50 by a plurality of data/address lines 58.

As described above, the user inputs data to telephone data terminal 10 using either bar code reader wand 16, or by passing a magnetic strip card through slot 22. The bar code reader wand is connected to a bar code/magnetic strip interface 64 by a lead 18, while the output from the magnetic field sensor disposed within slot 22 is connected to the interface by means of a lead 66. Bar code/magnetic strip interface 64 accepts either the bar code encoded data or magnetic strip encoded data, and presents the encoded data signals to the CPU for processing into a digital format representing ASCII characters. In addition, the bar code/magnetic strip interface provides regulated power to the bar code wand through the connecting lead 18.

In the preferred embodiment, the bar code interface includes a Motorola type 74HC14 Schmidt trigger, which produces a pulse stream encoded data signal as the bar code reader wand scans a bar code. The magnetic field sensor similarly produces a pulse stream encoded data signal, which the magnetic strip interface amplifies using a generally conventional amplifier circuit. The pulse stream encoded data signals from either the Schmidt trigger or the amplifier circuit are decoded by CPU 50 using its internal timers to compare the relative widths of each of the pulses. A relatively short pulse represents a logical zero, and a relatively longer pulse represents a logical one, producing a binary bit pattern representative of an ASCII character.

As the pulse stream encoded data signal input from the bar code reader wand or the magnetic strip card reader are decoded into ASCII characters, they are shown on display 14, which is connected to CPU 50 through a plurality of leads 70. In addition, data stored in RAM 56 may be selectively shown on display 14, as described below. A beeper 102 connected to CPU 50 by leads 70 generates audible tones to alert the user of any condition requiring action.

When the user of telephone data terminal 10 wants to dial another telephone, the conventional push-button dial keypad on telephone 28 may be used, or alternatively, the user may "dial" the telephone number using either bar code reader wand 16 or by passing an appropriately encoded magnetic strip through slot 22. The telephone number to be dialed is encoded in the bar code scanned by the user or is magnetically stored in magnetic strip 26. Before dialing with the encoded telephone number, the user must first place the telephone data terminal in a dial mode by scanning an appropriate predefined encoded data sequence with bar code reader wand 16 or card 24. In response to the predefined data sequence, CPU 50 enters the dial mode in which the next data sequence entered by the user through either of the two input devices is converted to ASCII data by CPU 50 and output over lead 74 to a dual tone multiple frequency (DTMF) generator 72. DTMF generator 72 converts the digital ASCII characters representing the number dialed into the appropriate DTMF signal for transmission to a remote telephone switching center where the signal is used by the telephone system to connect the telephone dialed.

In the preferred embodiment, DTMF generator 72 is a Mitel type TP 5088 integrated circuit. Its output is connected by a lead 76 to a telephone line interface 78 of generally conventional design, including an amplifier having an output connected to drive a coupling and impedance matching transformer. A DC blocking capacitor is interposed between the output of the transformer and a connection to the phone system. The elements comprising telephone line interface 78 are not separately shown. Details of telephone line interface 78 are very well known to those of ordinary skill in the telephone equipment art and need not be separately shown to adequately disclose the present invention.

The signal from the telephone line interface is output over a lead 84 to a modular telephone jack 86, which is connected by lead 32 (shown in FIG. 1) to the local telephone line. Telephone data terminal 10 is normally in an "idle mode," in which telephone 28 may be used in a conventional manner. In the event that the user elects to dial a number using telephone 28, a DTMF generator provided in the telephone generates the necessary DTMF signal, which is input to telephone line interface 78 through modular jack 82 and leads 80. The DTMF signal then passes into the telephone system through lead 84 and modular telephone jack 86 as described above.

CPU 50 keeps track of the status of the telephone line and controls the connection of telephone 28 to the telephone line using signals input to a telephone line control and sense circuit 90 over leads 88. The telephone line control and sense circuit comprises a relay controlled by flip-flops using a current sensing transformer (not separately shown) connected to lead 84, as is well known to those of ordinary skill in the art.

In addition to reading a bar code or magnetic strip representing a telephone number to be dialed, bar code reader wand 16 and the magnetic field sensor within slot 22 are used to input other predefined encoded data to CPU 50, which control the mode in which telephone data terminal 10 operates. For example, a user may choose to enter a "message mode," in which display 14 continuously shows a message input by the user using either the bar code reader wand or the magnetic field sensor. The message mode is entered when the user scans either a bar code or magnetic strip containing a predefined encoded data sequence recognized by CPU 50 as initiating operation in that mode.

After entering the message mode, the next data input by the operator, stored either as a bar code, or in a magnetic strip, comprises a message that is converted by CPU 50 from the pulse stream encoded data signal conveyed along conductor 68 into a digital ASCII signal that is output via conductor 70 to display 14. For example, when leaving his desk, the user may input a message of up to 40 characters in length indicating where he can be located, or at what time he will return. Anyone approaching his desk may read the message on display 14.

Since a user may frequently need to scan and transmit the same encoded data sequences, telephone data terminal 10 can store up to 100 messages of up to 20 characters each in digital ASCII format, within RAM 56. To do so, the user scans an appropriate predefined encoded data sequence recognized by CPU 50 as initiating operation of the telephone data terminal in a "program mode." The user then scans encoded data identifying the number of an addressable register within RAM 56. Encoded data scanned by the user are stored in the specified register; they may later be recalled by scanning another predefined encoded data sequence. The user may also enter the program mode to change or delete the data stored in a selected register, in much the same manner as they were originally stored. Data stored in a register addressed by the user are shown on display 14. Loss of line power to telephone data terminal 10 does not affect the retention of the data within RAM 56, due to the provision of backup battery supply 60.

Perhaps a more important use of the telephone data terminal is for input of data that are transmitted to another location over the telephone system in one of two different "data collection modes." The user enters either a "voice prompted" or a "display prompted" data collection mode by scanning an appropriate predefined encoded data sequence with the bar code reader wand, or by passing an appropriately encoded magnetic strip 26 through slot 22. CPU 50 recognizes the encoded data sequence, and places the telephone data terminal in the desired mode. Once the data collection mode is entered, the user transmits data to the other location by optically scanning the encoded data as a bar code or by passing a magnetic strip in which they are encoded through slot 22. Data stored in a specific register of RAM 56 may also be selected by the user and transmitted in the data collection mode.

In the voice prompted data collection mode, specific data are requested to be transmitted by a voice prompt sent to the user through the handset of telephone 28. In this case, the user establishes connection with the remote location by dialing its telephone number, either with telephone 28 or by using the bar code reader wand or magnetic strip, as previously explained. Once the connection is made, the user enters the voice prompted data collection mode by scanning the appropriate predefined encoded data sequence and then listens for a voice prompt from the remote location on telephone 28.

In response to the prompt message, the user scans the requested encoded data with either of the two input devices, generating a pulse stream encoded data signal that is decoded by CPU 50. The ASCII characters are converted to a DTMF signal by DTMF generator 72, for transmission to the remote location over the telephone system. The signals produced by DTMF generator 72 are, of course, compatible with the telephone system, and readily communicate data to a receiving terminal equipped to decode the DTMF signal.

Since a conventional dial DTMF signal includes only 16 coded dual tone signals, it is necessary to combine these twelve signals to communicate a full range of alphanumeric characters. In the preferred embodiment, each alpha character is represented by a combination of three dual tones, the first dual tone being that corresponding to the "*" on a conventional push-button telephone keypad. The rate at which data is transmitted is relatively slow using the DTMF signal, and is therefore only appropriate for short messages.

Another mode of communication is provided for transmission of encoded data input by the user with the bar code reader wand or magnetic strip 26. The alternate mode of communication uses a data link signal incompatible with a conventional telephone system, having a DC level that varies in potential between positive and negative levels, which is only appropriate for communication on a local basis, i.e., between data terminals and other devices that are interconnected "locally," on the customer side of a PBX board. In order to communicate using the noncompatible data link signal, it is necessary to disconnect or interrupt the local telephone line that ties telephone data terminal 10 to the PBX board, and thus to the telephone system, as disclosed below. Telephone 28 is not operational in the display prompted data collection mode.

Referring still to FIG. 2, data from CPU 50 that is to be transmitted using the data link signal is conveyed through leads 92 to a serial universal asynchronous receiver transmitter (UART) 94, which in the preferred embodiment is an NEC type 82C51 integrated circuit. The output of the UART is connected through a lead 96 to a data transceiver 98 (a Texas Instrument type 75176 chip). The data transceiver transmits the data link signal output from the UART to the telephone line connected to modular jack 86 through leads 100, which connect it to the telephone line interface. Telephone data terminal 10 is capable of bidirectional operation, permitting a data link signal received from the local telephone line to be input to CPU 50 (for decoding) through data transceiver 98, and UART 94. Details of its operation in a data collection network are discussed in further detail below.

For transmitting data to a local data processor, the user may elect to operate the telephone data terminal in the display prompted data collection mode. As noted above, the user scans an appropriate predefined encoded data sequence to initiate the display prompted data collection mode. In response, CPU 50 enters the desired mode, and converts the predefined encoded data sequence into ASCII data that are output to DTMF generator 72. The DTMF generator produces a corresponding DTMF signal that is transmitted to a telephone line controller (not shown in FIG. 2) over the local telephone line.

The telephone line controller responds to the encoded DTMF signal by disconnecting the telephone data terminal from the telephone system, and causing the telephone line to which the telephone data terminal is attached to appear "busy" with respect to any incoming telephone calls directed to it. Thereafter, the telephone line controller transmits an appropriate prompt signal over the local telephone line to the telephone data terminal, in the form of a data link signal. The received data link signal passes through data transceiver 98 and serial UART 94 to CPU 50, which decodes the data link signal, causing the message it contains to be shown on display 14. The message prompts the user to transmit specific data. In response to the displayed prompt message, the user scans the requested encoded data for transmission back through the telephone line controller to a data processor, using the data link signal format. By using the data link signal, the data transmission rate is greatly increased compared to the DTMF signal. The user is thus able to download bar code or magnetic strip encoded data much more rapidly than would be possible using the DTMF signal format.

Figure 3:
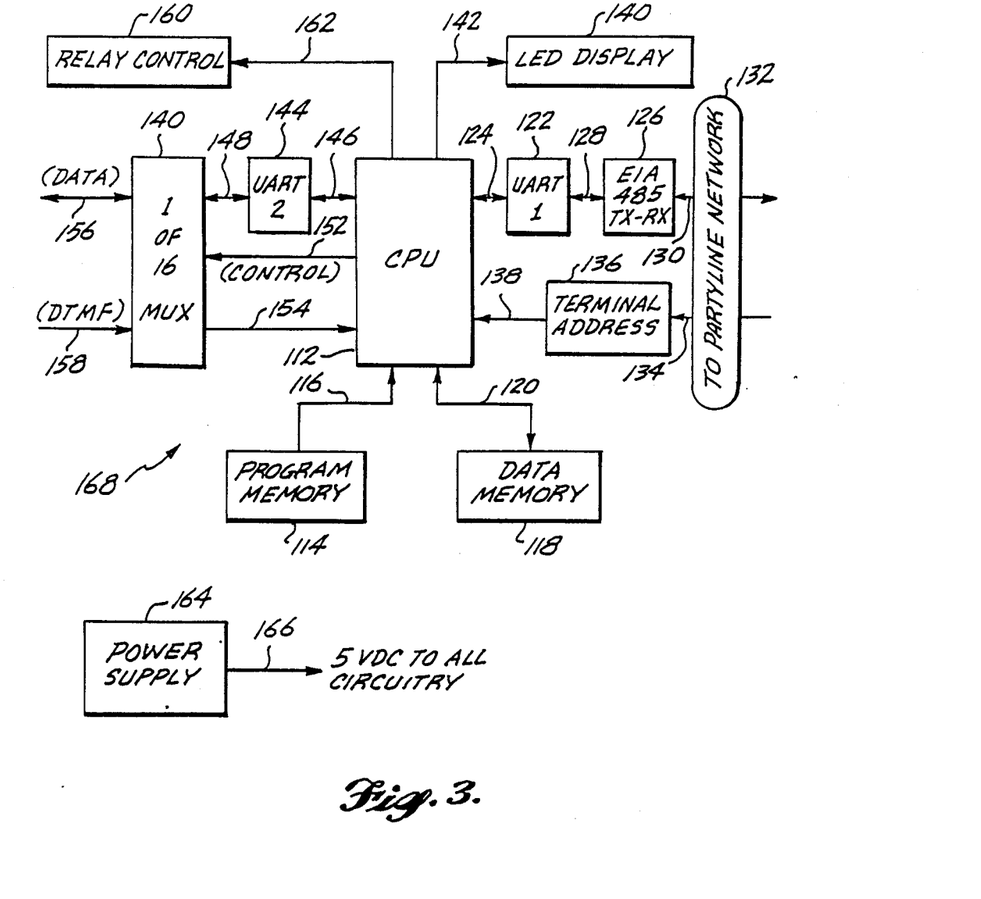
FIG. 3 is a schematic block diagram illustrating the elements comprising a telephone line controller used in a telephone data collection network.

Details of the telephone line controller, generally identified by reference numeral 110, are shown in FIG. 3. Telephone line controller 110 includes a central processing unit (CPU) 112. In the preferred embodiment, CPU 112 comprises an Intel type 8085 eight-bit microprocessor, a Motorola type 74HC138 address decoder, and Motorola type 74LS245 and 74LS373 integrated circuits as address and data bus drivers. The microprocessor and integrated circuits are not separately shown, being connected in an entirely conventional manner. CPU 112 is connected to ROM 114 via address/data lines 116 and to RAM 118 via address/data lines 120. ROM 114 is used to store the digitally encoded software program controlling operation of the telephone line controller, while RAM 118 stores temporary data, such as stack and register values.

Figure 5:
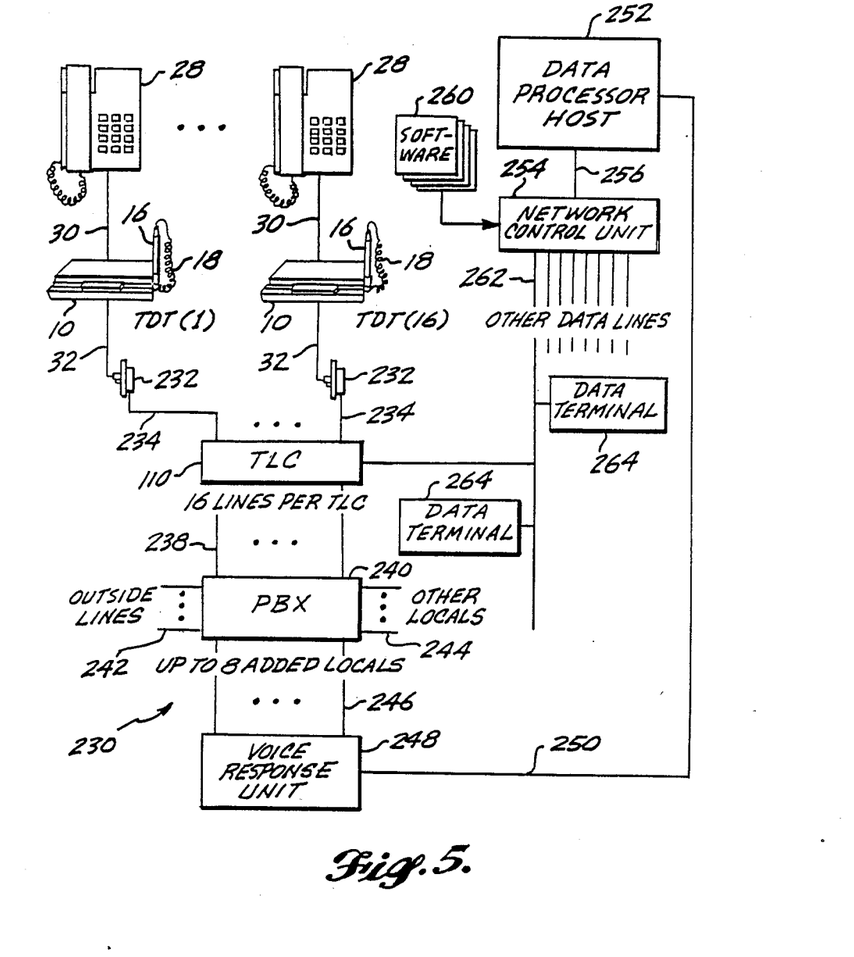
FIG. 5 schematically illustrates a telephone data collection network.

A UART (1) 122 comprising one-half of a Western Digital type WD2123 integrated circuit, is connected to CPU 112 via leads 124, and is used for serial communication between the CPU and a party line data collection network (shown in FIG. 5). UART 122 is connected to a transceiver interface 126, which in the preferred embodiment, comprises a Texas Instrument type 75176 integrated circuit. The transceiver chip functions as a line driver for serial signals output from CPU 112 and further amplifies incoming serial signals that are input to the CPU over leads 128. These bidirectional serial signals conform to the EIA-485 format. The transceiver chip is connected to the party line data collection network through a plug-in connector 132 by leads 130.

A terminal address circuit 136 is also connected to the plug-in connector by leads 134, and in the preferred embodiment, comprises a Motorola type 74LS541 integrated circuit; it inputs an eight-bit code to CPU 112 enabling the CPU to identify its address on the party line data collection network. The output of the terminal address circuit is connected to CPU 112 through leads 138.

The status of the telephone line controller is indicated on five light emitting diodes (LED's) comprising a display 140. Display 140 is connected to CPU 112 by leads 142. Since the telephone line controller is normally mounted in a telephone equipment rack that is out of sight in a telephone equipment room, LED display 140 is of little significance other than to service personnel monitoring the operation of the device.

A second UART (2) 144, comprising the other half of the Western Digital type WD2123 integrated circuit, is connected to CPU 112 through leads 146, and is only active when one or more telephone data terminals connected to the telephone line controller are transmitting data using the data link signal. UART 144 is connected to a multiplex (MUX) circuit 150 by leads 148. MUX circuit 150 is controlled by signals output from CPU 112 over control leads 152. It comprises three banks of 16-bit latches, two banks of which in the preferred embodiment comprise Motorola type 74LS374 integrated circuits, and one bank of which comprises Motorola type 74LS541 integrated circuits, (none of which are separately shown). Each bank includes a pair of these integrated circuits. The two banks of type 74LS374 chips are used for addressing a selected one of 16 telephone data terminals connected to telephone line controller 110, using the data link signal. The bank of type 74LS541 integrated circuits are used to identify a specific one of the 16 telephone data terminals connected to telephone line controller 110 for data link signal communication, after receiving a predefined DTMF signal from the specific one of the telephone data terminals.

When one of the telephone data terminals transmits the predefined DTMF signal, CPU 112 causes MUX 150 to select the active data terminal, and sends an appropriate prompt signal back to the telephone data terminal using a data link signal output over leads 156. Leads 156 connect to 16 telephone interface circuits 168 (shown in FIG. 4), as described below.

However, before the display prompt data link signal is transmitted, CPU 112 disconnects the telephone data terminal from the telephone system, by means of a relay control signal that actuates one of 16 relay controls 160. The relay control signals are connected to the relay controls by means of leads 162. In the preferred embodiment, relay controls 160 comprise two banks of Motorola type 74LS374 18-bit latches, and 16 double pole-double throw relays. Once the appropriate relay has been energized in response to the relay control signal provided over leads 162, CPU 112 outputs the data link signal through UART 144 to the telephone data terminal, i.e., to the one requesting operation in the display prompted data collection mode, through data lines 156, which connect the MUX circuit to the telephone interface circuit.

A generally conventional power supply 164 provides 5 volts DC to each of the components of the telephone line controller over leads 166. Power supply 164 also provides current to actuate the relays included within relay controls 160.

Figure 4:
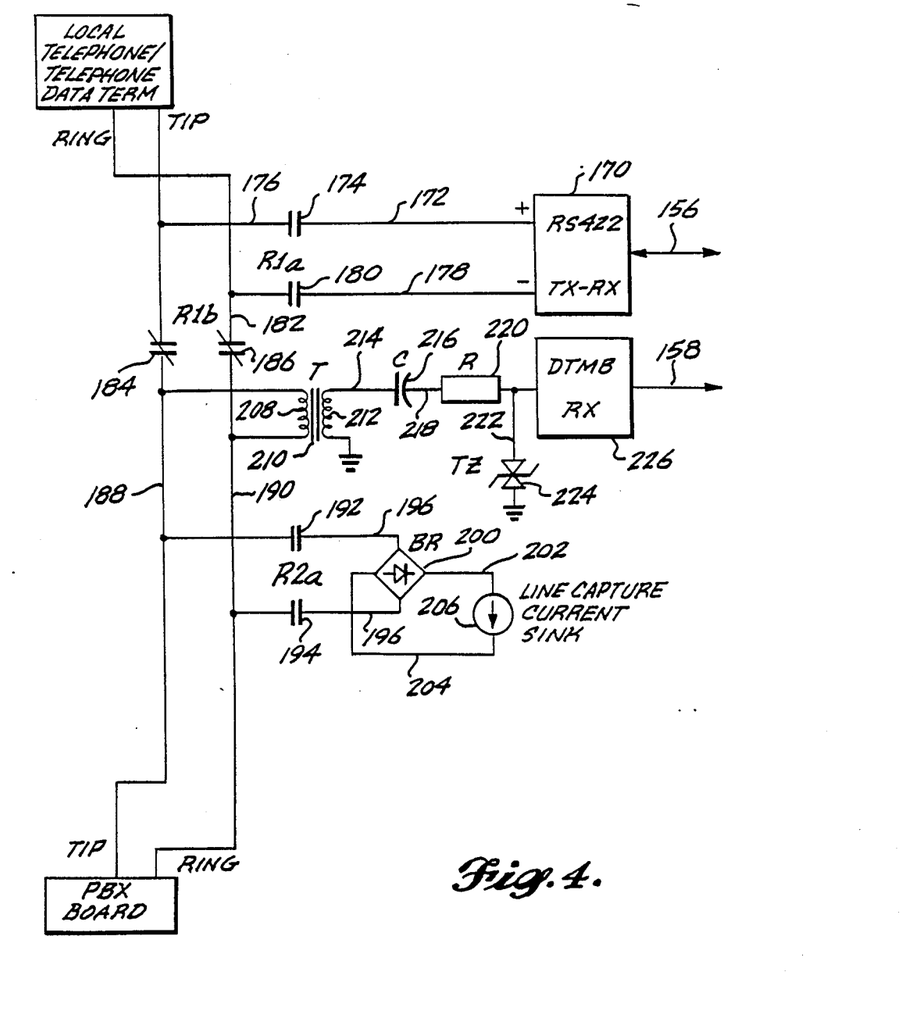
FIG. 4 is a schematic block diagram of a telephone interface circuit, typical of each such circuit used to interface a telephone data terminal to the telephone line controller.

With reference to FIG. 4, a typical circuit for one of 16 telephone interface circuits is shown, generally denoted by reference numeral 168. Each telephone interface circuit connects one of the telephone data terminals 10 to the telephone line controller 110 and is physically disposed within the telephone line controller and is a part of it. As explained above, each telephone line controller in the data collection network is connected to 16 telephone data terminals. The telephone interface circuit shown in FIG. 4 controls the flow of data between the PBX board (shown in FIG. 5) and the telephone data terminal over a local telephone line.

DTMF signals from the telephone data terminal are conveyed over the local telephone line on a tip lead 176 and a ring lead 182 through normally closed relay contacts 184 and 186, respectively. On the other side of the normally closed relay contacts are connected a tip lead 188 and a ring lead 190, leading to the PBX board. A DTMF signal from the telephone data terminal connected to leads 176 and 812 passes through the normally closed contacts 184 and 186, providing current flow through a primary winding 208 of a current transformer 210. The primary winding is connected between tip lead 188 and ring lead 190.

A secondary winding 212 of transformer 210 is connected between ground and one side of a DC blocking capacitor 216 by a lead 214. The other side of capacitor 216 connects to a resistor 220. The DTMF signal is coupled from transformer 210 by capacitor 216 through resistor 220 and is connected to a DTMF receiver 226 by a lead 222. Lead 222 also is connected to ground through a suppressor 224, which prevents voltage spikes from damaging the DTMF receiver. In the preferred embodiment, DTMF receiver 226 is a Mitel type MT8870 integrated circuit. As noted above, the DTMF signal from the telephone data terminal is input to the telephone line controller through leads 158.

Whenever the telephone data terminal transmits a predefined sequence DTMF indicating a request for display prompted data collection mode operation, it is received through DTMF receiver 226, causing telephone line controller 110 to produce a relay control signal that opens relay contacts 184 and 186. By opening these relay contacts, the local telephone line running to telephone data terminal 10 is disconnected from the telephone system.

At the same time as relay contacts 184 and 186 open, relay contacts 174 and 180, connected respectively to the tip and ring leads 176 and 182, close. Telephone data terminal 10 is thereby connected through leads 172 and 178 to an EIA RS-422 transceiver, which in the preferred embodiment, comprises a Texas Instrument type 75176 integrated circuit. A data link signal conforming to EIA RS-422 is output from the telephone line controller, conveying a prompt message to the telephone data terminal through the RS-422 transceiver to the appropriate telephone data terminal. The message is shown on display 14 and requests that the operator scan specific encoded data for transmission to the telephone line controller. The requested data is transmitted to a data processor as determined either by data collection network protocol or by the original predefined encoded data sequence transmitted using the DTMF signal.

A short time (approximately 2 seconds) after relay contacts 174 and 180 close, contacts 192 and 194 also close. Contacts 192 and 194 are respectively connected to tip lead 188 and ring lead 190. Leads 196 extend from the other side of relay contacts 192 and 194, thus connecting the tip and ring lead to a full wave rectifier bridge 200. The fully rectified signal output from full wave rectifier bridge 200 is connected to a constant current sink 206 by leads 202 and 204. The constant current sink ensures that a constant 15 milliamp current is drawn from the output of full wave rectifier bridge 200, so that with respect to an incoming telephone call the telephone line comprising tip and ring leads 188 and 190 appears to be "busy." The telephone system responds by generating a busy signal on the incoming caller's telephone line.

Each of the telephone lines associated with an active telephone data terminal is similarly caused by telephone line controller 110 to appear busy with respect to any telephone calls directed to it from the telephone system. Once the telephone data terminal is no longer required for transmission of an RS-422 data link signal, the relay controlling contacts 174, 180, 184, 186, 192, and 194 is deenergized, permitting the contacts to return to their normal condition.

An exemplary fully configured data collection network is shown in FIG. 5, generally denoted by reference numeral 230. Sixteen identical telephone data terminals 10 are each connected via a local telephone line 32 to a modular jack 232, and are connected through separate local telephone lines 234 to telephone line controller 110. If greater capacity is required, it is possible for additional telephone line controllers to be installed, each having up to 16 telephone data terminals connected to them. Telephone lines 234 include tip and ring leads 176 and 182 (shown in FIG. 4), whereas each of the telephones lines 238 comprise tip and ring leads 188 and 190 (also shown in FIG. 4).

A PBX board 240 is connected to outside telephone lines 242 and to other local telephone lines 244. In addition, a voice response unit (VRU) 248 is connected through leads 246 to the PBX board for use in supplying a synthesized or digitally recorded verbal message. The verbal message is connected either to incoming calls from the telephone system on lines 242 or to local telephone data terminals that are connected to the PBX console through one of the telephone line controllers 110.

Voice response unit 248 is connected by a data line 250 to a local data processor (or host computer) 252, used for recording and maintaining data input from the telephone data terminals. Data processor 252 is connected through data lines 256 to a network control unit (NCU) 254. The NCU controls the flow of data input to data processor 252 from a variety of other data terminals 264 through a plurality of data network party lines 262. NCU 254 operates in accord with programs included in software 260 that is stored within it on a hard disk or in some other nonvolatile storage medium. Any of the data network party lines 262 may connect to telephone line controller 110, enabling each of the telephone data terminals connected to the telephone line controller to input data to the data processor by scanning bar codes, or by use of magnetic strips. By scanning an appropriate predefined encoded data sequence, a user may cause data processor 252 to transmit requested data to one of the telephone data terminals, using a data link signal, thus downloading the requested data to the data terminal.

When operating in the voice-prompted data collection mode, data processor 252 controls voice response unit 248, causing it to request specific data. As explained previously, the data is transmitted to the data processor using a DTMF signal that is compatible with the telephone system. Accordingly, it should be apparent that the voice response unit and data processor 252 may be remotely located, e.g., in a different building than the telephone data terminals. Data must be transmitted to a remotely located data processor from the telephone data terminals using DTMF signals (or some other telephone system compatible signal). If the data processor is located locally, i.e., if it is connected to a telephone line controller on the local line side of the PBX board as shown in FIG. 5, a data link signal may be used for transferring data from the telephone data terminals to the data processor through the telephone line controller.

While the present invention has been described with respect to a preferred embodiment, those of ordinary skill in the art will appreciate that modifications may be made thereto within the scope of the claims that follow below. Accordingly, it is not intended that the invention be in any way limited by the disclosure, but that it be determined entirely by reference to the claims that follow.

The embodiments of the invention in which an exclusive property or privilege is claimed are defined as follows:

1. Apparatus operable in a plurality of modes, including a program mode for reading encoded data that are stored in a nonvolatile medium, so that they may be transmitted from one location to another over a telephone system, comprising:
   (a) means for scanning the encoded data, producing a data signal;
   (b) processor means, connected to the means for scanning encoded data, for converting the data signal to ASCII data; said processor means including means for operating the processor means in the program mode that permits ASCII data converted from scanned encoded data to be stored, in response to an operator scanning a first predefined encoded data sequence with the means for scanning said first predefined encoded data scanned by the operator thus determining in which mode the apparatus operates;
   (c) nonvolatile memory means, connected to the processor means, for digitally storing the ASCII data in an addressable register as it is scanned by the operator, independent of the operation of the telephone system, for later transmission over the telephone system.

2. The apparatus of claim 1, further comprising tone generator means, connected to the processor means and to the telephone system, for converting the ASCII data into a DTMF signal that is transmitted to the other location over the telephone system, wherein the nonvolatile memory means include a plurality of addressable registers in which different ASCII data are stored, and wherein the processor means are further operative to cause the tone generator means to convert the ASCII data stored in an operator selected addressable register into the DTMF signal for transmittal to the other location.

3. The apparatus of claim 2, further comprising display means, connected to the processor means, for displaying the ASCII data, wherein the processor means are further operative to select the ASCII data stored in a specific addressable register to be displayed by the display means in response to the operator scanning a second predefined encoded data sequence with the means for scanning.

4. The apparatus of claim 1, wherein the encoded data comprise a bar code, and wherein the means for scanning comprise an optical bar code sensor that is responsive to light reflected from the bar code.

5. The apparatus of claim 1, wherein the encoded data comprise areas of varying magnetic field intensity occurring sequentially along a magnetic strip, and wherein the means for scanning comprise a magnetic field sensor.

6. The apparatus of claim 2, wherein in the program mode, the ASCII data can be changed or deleted from the addressable register.

7. The apparatus of claim 2, wherein a telephone is connected to the telephone system in combination with the apparatus, said telephone being usable and functioning in a conventional manner while the processor means are in the program mode.

8. Apparatus operates in a plurality of modes including a display prompt mode for communicating data over a telephone system, said apparatus being connected to the telephone system through a telephone line controller, comprising:
   (a) scanning means for scanning encoded data stored in a nonvolatile medium, producing a data signal corresponding to said encoded data and for scanning specific encoded data sequences stored in the nonvolatile medium, that determines in which mode the apparatus operates;

(b) an alphanumeric character display; and (c) processor means, connected to the scanning means, for:
  (i) during operation of the apparatus in the display prompt mode receiving a prompt message over a local telephone line from the telephone line controller, requesting that specific encoded data be transmitted;
  (ii) prompting an operator to scan the requested encoded data with the scanning means by displaying the prompt message on the alphanumeric display; and
  (iii) converting the data signal produced by the operator scanning the requested encoded data with the scanning means into a data link signal for transmission over the local telephone line, through the telephone line controller to a receiving station.

9. The apparatus of claim 8, wherein the telephone line controller disconnects the local telephone line from the telephone system in response to the operator scanning encoded data that causes the processor means to operate in a display prompted data collection mode.

10. The apparatus of claim 9, wherein the data link signal comprises an asynchronous signal having a varying direct current polarity, which is not compatible with the telephone system.

11. The apparatus of claim 8, further comprising tone generator means, connected to the telephone line and to the processor means, for converting the data signal into a DTMF signal for transmission to the receiving station over the telephone system.

12. The apparatus of claim 11, wherein the tone generator is connected to the local telephone line, said processor means operating in a voice prompted data collection mode in response to the operator scanning appropriate encoded data, wherein the operator receives voice signals prompting the operator to scan the requested encoded data with the scanning means, said processor means being further operative to convert the data signal produced by the operator scanning the requested encoded data into ASCII data, and said tone generator means being operative to convert said ASCII data into a DTMF signal for transmission to the receiving station over the telephone system.

13. The apparatus of claim 8, wherein the requested encoded data comprise a bar code, and wherein the scanning means comprise an optical bar code sensor that is responsive to light reflected from the bar code.

14. The apparatus of claim 8, wherein the requested encoded data comprise areas of varying magnetic field intensity occurring sequentially along a magnetic strip, and wherein the scanning means comprise a magnetic field sensor.

15. Apparatus for reading encoded data that are stored in a nonvolatile medium and transmitting the data to a remote terminal over a telephone system when operating in a data communications mode, and, when operating in a message mode and not actively connected into the telephone system, displaying a message, said apparatus comprising:

(a) scanning means for scanning the encoded data, producing a data signal that is transmitted to a remote terminal during operation of the apparatus in a data communication mode;

(b) processor means, connected to the scanning means, for converting the data signal into ASCII data, said processor means including an addressable register in which the ASCII data are selectively stored for display in the message mode; and (c) display means, connected to the processor means, for displaying the ASCII data as a plurality of alphanumeric characters in response to an operator scanning a first predefined encoded data sequence with the scanning means, said processor means including means for recalling the ASCII data stored in the addressable register of the apparatus to be displayed in the message mode in response to the first predefined encoded data sequence and independent of the operation of the telephone system specific encoded data sequences stored in the nonvolatile medium that are scanned by the operator thus determining in which mode the apparatus operates.

16. The apparatus of claim 15, wherein the encoded data comprise a bar code, and wherein the scanning means comprise an optical bar code sensor that is responsive to light reflected from the bar code.

17. The apparatus of claim 15, wherein the encoded data comprise areas of varying magnetic field intensity occurring sequentially along a magnetic strip, and wherein the scanning means comprise a magnetic field sensor.

18. The apparatus of claim 15, wherein the processor means are further operative to effect operation of the apparatus in the data communication mode in response to the operator scanning a second predefined encoded data sequence with the scanning means.

19. Apparatus operable in a plurality of modes, including a mode for selectively communicating encoded data that are stored in a nonvolatile medium over an analog telephone system that uses DTMF tone dialing, comprising:

(a) a plurality of local data terminals, each including:
  (i) scanning means for scanning the encoded data, producing a data signal;
  (ii) processor means, connected to the scanning means, for converting the data signal into ASCII data; and
  (iii) tone generator means, connected to the processor means and to a local telephone line, for converting the ASCII data into a DTMF signal that is transmitted over the local telephone line;

(b) a local data processor connected to the local telephone lines and operative to bidirectionally receive and transmit data using a data link signal; and (c) telephone line controller means, connected to each of the local data terminals by their respective local telephone lines and to the local data processor by a data line, and to a remote location by the telephone system, for selectively controlling the flow of data link signals between any one of the local data terminals and the local data processor, and of DTMF signals between any one of the local data terminals and the remote location over the telephone system in response to an operator scanning predefined encoded data sequences at said one of the local data terminals, using the scanning means said first predefined encoded data sequence scanned by the operator thus determines in which mode the apparatus operates.

20. The apparatus of claim 19, wherein the telephone line controller means respond to the DTMF signal produced by the tone generator means at said one local data terminal as the operator scans the selected predefined encoded data sequence, by disconnecting said one local data terminal from the telephone system, connecting it in communication with the local data processor using data link signals that are incompatible with the telephone system, and causing the local telephone connecting to said one local data terminal to appear busy with respect to any incoming telephone calls directed to it.

21. The apparatus of claim 19, wherein the telephone line controller means respond to the DTMF signal produced by the tone generator means at said one local data terminal as the operator scans the selected predefined encoded data sequence, by disconnecting said one local data terminal from the telephone system, connecting it in communication with the local data processor using data link signals that are incompatible with the telephone system, causing the local data processor to download requested data to said local data terminal and causing the local telephone line connected to said local data terminal to appear busy with respect to any incoming telephone calls directed to them.

22. The apparatus of claim 19, wherein the encoded data comprise a bar code, and wherein the scanning means comprise an optical bar code sensor that is responsive to light reflected from the bar code.

23. The apparatus of claim 19, wherein the encoded data comprise areas of varying magnetic field intensity occurring sequentially along a magnetic strip, and wherein the scanning means comprise a magnetic field sensor.

* * * * *

UNITED STATES PATENT AND TRADEMARK OFFICE
CERTIFICATE OF CORRECTION

PATENT NO. : 4,897,865
DATED : January 30, 1990
INVENTOR(S) : Canuel

It is certified that error appears in the above-identified patent and that said Letters Patent is hereby corrected as shown below:

| Column | Line | |
|---|---|---|
| [56] | 3 | "S.L. Weinstein, "Smart Credit Cards the Answer to Cashless Shopping", " should be --S.L. Weinstein, "Smart Credit Cards: The Answer to Cashless Shopping",-- |
| 13 | 6 | "telephones" should be --telephone-- |
| 14 | 15 | "scanning" should be --scanning,-- |
| 15 | 3 | "determines" should be --determine-- |
| 15 | 9 | "mode" should be --mode,-- |
| 18 | 4 | "terminal" should be --terminal,-- |

Signed and Sealed this

Sixteenth Day of July, 1991

Attest:

HARRY F. MANBECK, JR.

Attesting Officer

Commissioner of Patents and Trademarks